United States Patent [19]

Duchesneau

[11] Patent Number: 4,822,386
[45] Date of Patent: Apr. 18, 1989

[54] FILTER REPLACEMENT MECHANISM

[75] Inventor: Jerome G. Duchesneau, Andover, Conn.

[73] Assignee: United Technologies Corporation, Hartford, Conn.

[21] Appl. No.: 125,844

[22] Filed: Nov. 27, 1987

[51] Int. Cl.$^4$ .................. B01D 27/08; B01D 46/02
[52] U.S. Cl. .................................. 55/274; 55/480; 55/481; 55/502; 55/507
[58] Field of Search ............... 55/274, 422, 480, 481, 55/490, 493, 501, 502, 504–507; 210/232, 237, 238

[56] References Cited

U.S. PATENT DOCUMENTS

| | | | |
|---|---|---|---|
| 2,853,153 | 9/1958 | Sexton | 55/481 X |
| 2,974,749 | 3/1961 | Donguy | 55/478 |
| 3,383,841 | 5/1968 | Olson et al. | 55/481 X |
| 3,393,498 | 7/1968 | Schoen | 55/501 X |
| 3,493,115 | 2/1970 | Koches | 55/502 X |
| 3,507,100 | 4/1970 | Neumann | 55/502 |
| 3,593,503 | 7/1971 | Andrews | 55/504 X |
| 3,816,984 | 6/1974 | Neumann | 55/502 |
| 4,251,246 | 2/1981 | Andreychek | 55/504 X |
| 4,290,792 | 9/1981 | Eckstein et al. | 55/504 X |
| 4,498,914 | 2/1985 | Ericksen | 55/505 X |
| 4,504,293 | 3/1985 | Gillingham et al. | 55/504 X |
| 4,533,476 | 8/1985 | Watkins | 210/238 X |

FOREIGN PATENT DOCUMENTS

| | | | |
|---|---|---|---|
| 861301 | 1/1971 | Canada | 55/481 |
| 973709 | 2/1951 | France | 55/480 |
| 2396580 | 3/1979 | France | 55/504 |
| 2448380 | 10/1980 | France | 55/502 |

Primary Examiner—Robert Spitzer
Attorney, Agent, or Firm—Lloyd D. Doigan

[57] ABSTRACT

An easily manipulable camming mechanism is disposed within a cavity designed to hold a standard nuclear biological filter within an environmentally sealed military vehicle. The camming mechanism utilizes a cammed actuator to transfer a motive force to a spring which urges a piston to engage or disengage an inlet or an outlet of the filter. The spring ensures that seals on the filter are compressed to the proper force and absorbs excessive torque which might damage the filter or the mechanism.

7 Claims, 2 Drawing Sheets

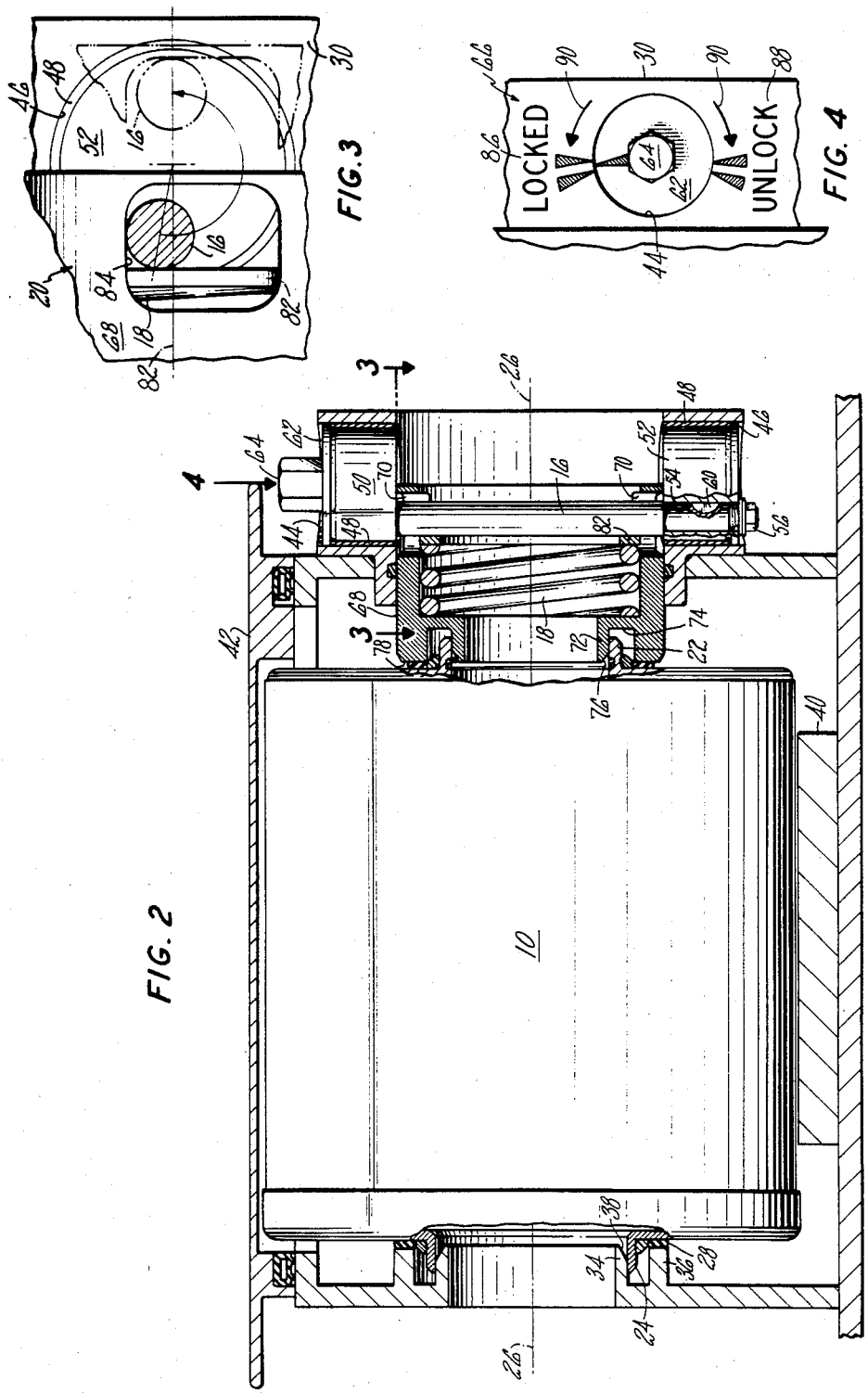

4,822,386

FILTER REPLACEMENT MECHANISM

DESCRIPTION

1. Technical Field

This invention relates to a military vehicle, such as a mobile howitzer, and more particularly to a mechanism for replacing a nuclear and biological contaminate air filter disposed within such a vehicle.

2. Background Art

Standard military nuclear biological contaminate (NBC) air filters are designed for installation within environmentally sealed military vehicles such as a mobile howitzer. Ambient air flows through the filter, which removes contaminates, to insure that the inhabitants of the vehicle are safeguarded from those contaminates. To further insure the inhabitants safety, the filters, which may become saturated with contaminates, are removed from outside of the vehicle. In a hostile environment, it is obvious that a saturated filter must be replaced quickly and safely. Replacement is complicated, however, because the operator changing the filter must be wearing cumbersome clothing and gloves for his or her own safety.

DISCLOSURE OF INVENTION

It is an object of the invention to provide a quick and reliable means for replacing a standard military contaminate filter disposed within an environmentally sealed military vehicle.

It is a further object of the invention to provide a means for minimizing the probability of damage to a replacement filter or to the means while the filter is being replaced.

It is a further object of the invention to provide a means to quickly and easily replace a standard military filter even though cumbersome clothing and gloves may be worn.

These and other objects of the invention are accomplished by providing an easily manipulable camming mechanism which is disposed within a housing designed to hold an NBC filter within an environmentally sealed military vehicle. The camming mechanism utilizes a cammed actuator to transfer a motive force to a spring which urges a piston to engage or disengage an inlet or an outlet of the filter. The spring ensures that seals on the filter are compressed to the proper force and absorbs excessive torque which might damage the filter or the mechanism.

According to a feature of the invention, a pair of slots within the piston cooperate with the spring and the actuator to provide an over-center lock which holds the filter in its properly loaded position when unattended.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 2 is a plan view partly in cross section of the filter loaded within the housing;

FIG. 3 is a view of the drawing of FIG. 2 taken along the line 3—3 of FIG. 2; and FIG. 4 is a top view, taken along the line 4 of FIG. 2.

BEST MODE FOR CARRYING OUT THE INVENTION

Figure 1:
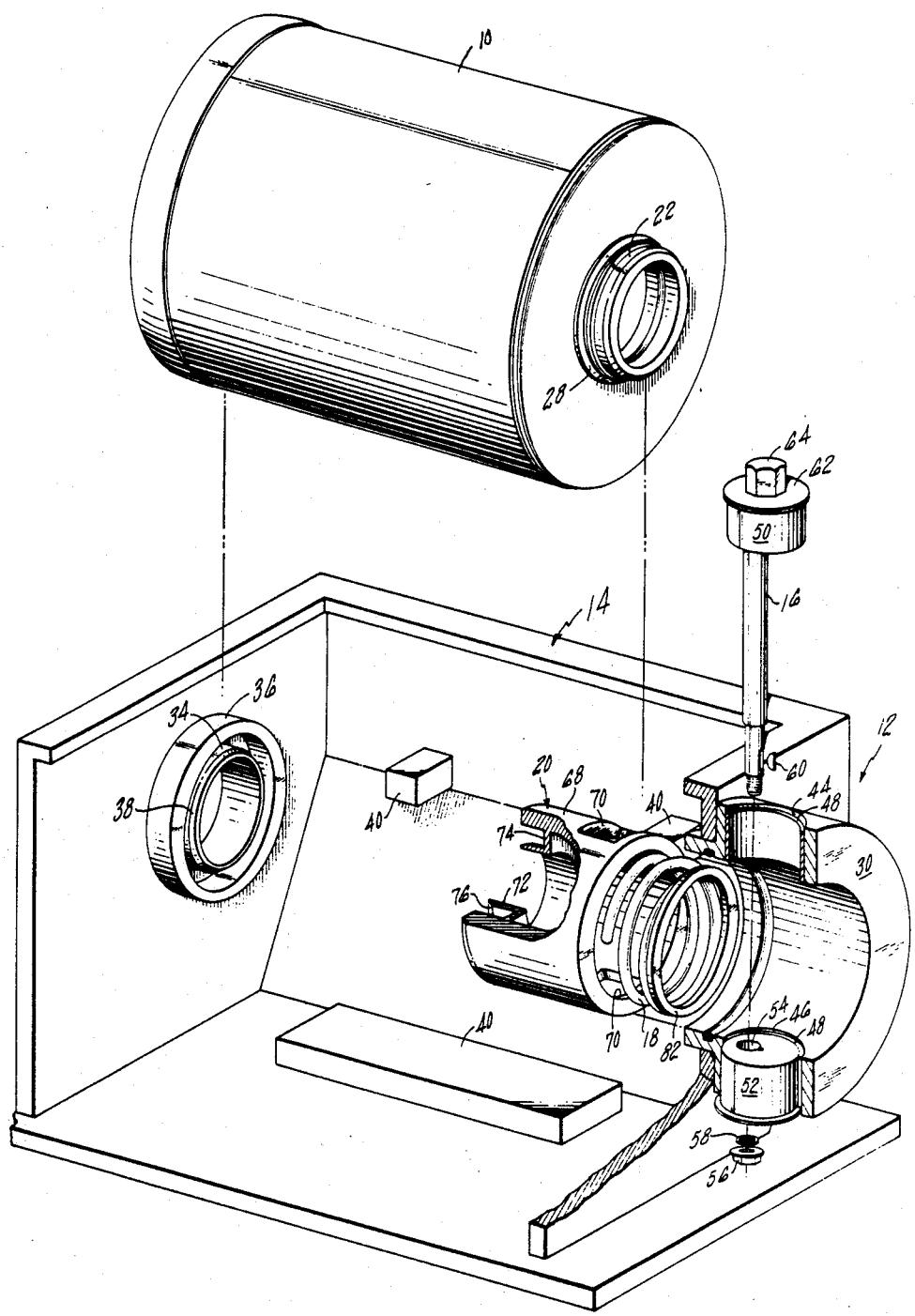
FIG. 1 is a perspective view, partly in section, and partly broken away showing the actuator and housing of the invention.

Referring to FIG. 1, a standard nuclear biological contaminate air filter 10 and an embodiment of the camming mechanism 12 of the invention is shown. The camming mechanism includes generally a housing 14, a camming rod 16, a spring 18, and a piston 20.

The filter 10 is canister-shaped having an inlet portion 22 and an outlet portion 24 (see FIG. 2). The inlet portion and the outlet portion are collar-shaped and extend along an axis 26 passing through the filter. The inlet and outlet portions are each surrounded by an annular face seal 28.

The housing 14 is designed for use in an environmentally sealed military vehicle. The housing has a collar-shaped inlet portion 30 and a coaxially disposed outlet portion 32. The outlet portion is comprised of an inner collar 34 and a coaxially disposed outer collar 36. The inner collar has a chamfered portion 38 for ease in loading the filter 10. A plurality of locating blocks 40 are disposed within the housing to position the filter for loading. A cover 42 is removably disposed over the housing to seal the housing from the environment.

Referring to FIGS. 1 and 2, an upper bore 44 and lower bore 46 are disposed coaxially along a vertical axis coincident with line 4 passing through the inlet portion 12. Each bore has a sleeve 48 bearing disposed therein. An upper bushing 50 and a lower bushing 52 are disposed for rotation within the upper bore and the lower bore respectively. Each bushing has an opening passing 54 therethrough, each opening being offset from the vertical axis. The rod 16 is attached to the upper bushing by conventional means and is attached to the lower bushing by a nut 56 and a washer 58. A key 60 cooperates with the lower bushing to prevent the rod from rotating. A plate 62, which may be visible to an operator(see FIGS. 2 and 4), is attached to the upper bushing for rotation therewith by a nut 64. The nut is located under a portion of the cover 42 (see FIG. 2) to prevent inadvertent (and potentially dangerous) manipulation of the camming mechanism. The plate has indicia 66 imprinted thereon as will be discussed infra.

The piston 20 is comprised of a cylindrical body 68 and has a pair of rectangular slots 70 passing therethrough, the slots being arranged parallel to the vertical axis. The iston has an inner collar 72 arranged coaxially therewith which attaches to the body of the piston via an inwardly depending flange 74. The inner collar has a chamfered outer portion 76 for ease in loading the filter. An end portion 78 of the body of the piston is adapted to engage the annular face seal 28. The rod is disposed through the upper and lower slots of the piston.

The rod 16 (which acts as a cam, as will be discussed infra) is connected to the piston via a washer 80 and the spring 18. The washer 80 anchors the right portion of the spring. The flange 74, depending from the body 68 of the piston, anchors the left portion of the spring. The washer abuts the rod.

The slots 70 (see FIG. 3 which shows the top slot) are dimensioned so that rotation of the bushings and the rod between an unlocked position, where the filter is fully loaded, and a locked position, where the filter may be unloaded, does not allow the rod to contact the piston. However, referring to FIG. 3, it is shown that once the rod passes the horizon 82, it is allowed to contact the top portion of the slot. Because the rod has passed over center, the force of the spring pushing back on the rod, locks the rod against the top portion 84 of the slot to prevent the rod from being urged back to the unlocked position. The slots cooperate to prevent the piston 20 from rotating within the inlet portion 30. Similarly, when the rod is in the unlocked position, the rod, due to the force of the spring, will lock against the top portion of the slot.

Referring to FIG. 4, indicia 66 is provided on the plate to indicate clearly that the piston is in either the locked 86 (i.e., loaded) or unlocked 88 (i.e., unloaded) position. Arrows 90 are also provided to indicate the proper direction of rotation of the nut to effectuate locking or unlocking. As is typical with rotating fasteners, clockwise rotation loads and locks the filter and counterclockwise rotation unloads and unlocks the filter.

In operation, the cover 42 is removed. An operator applies a wrench or the like to the nut 64 to move the rod 16 (and the piston 20 thereby) from the locked to the unlocked position. As the rod rotates, the piston is pulled away from the filter as the rod contacts the right-hand portion of the slots 70. In the unlocked position, the piston is well clear of a saturated filter which may then be removed. Once the filter is removed, a new filter 10 is placed within the housing so that it abuts the guide blocks 40. The nut is then rotated towards the locked position. The rod pushes against the washer 82 and the spring 18 which in turn push the piston 20 towards the left. The camfered edges 76, 38 of the piston 20 and the outlet portion 32 position the inlet 22 and the outlet 24 of the filter 10 as the piston moves towards the left. The piston and outlet portion lift the filter slightly of the guide blocks. In the fully locked position, the end portion 78 of the piston and the outer collar 36 of the outlet portion compress the face seals 28 and the rod 16 is secured in its over-center position as shown in FIG. 3.

By utilizing the camming mechanism of this invention, a wrench can be quickly, easily and safely applied to the nut 64 to lock or unlock the filter even though bulky protective clothing may be worn. Moreover, by providing indicia of locking or unlocking, camming components can be protected from over-torquing in the locked or unlocked position thereby maximizing actuator life. The slots 70 provide for a securely loaded filter by cooperating with the rod 16 to form an over-center lock.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. Apparatus for replacing a nuclear and biological filter which has an inlet portion and an outlet portion and is disposed for use within a mobile field howitzer characterized by;

a housing disposed within said howitzer for holding said filter, said housing comprising;

an inlet means for directing air from ambient to said filter, an outlet means for directing air from said filter to an interior portion of said howitzer, and a removable cover for sealingly enclosing said housing and said filter from said ambient; and, means for changing said filter under adverse environmental conditions, said means being disposed in either of said inlet means or said outlet means said means comprising;

a camming means for providing a loading or unloading force, a spring means for transferring said loading force from said camming means to said filter such that said force does not damage said filter and such that said filter is properly sealed, and a piston means for transferring said loading force from said spring means to said filter and for transferring said unloading force from said camming means to said filter, such that said filter is loaded or unloaded to or from said inlet means and said outlet means.

2. The apparatus of claim 1 wherein said camming means is further characterized by;

indicia means for clearly marking the position of said camming means to indicate whether said filter is loaded or unloaded so that said camming means is positioned such that said filter and said camming means are not damaged.

3. The apparatus of claim 1 wherein said piston means is further characterized by;

a piston for engaging either of said filter inlet or said filter outlet, said piston having means for centering itself within either of said filter inlet or said filter outlet.

4. The apparatus of claim 3 further characterized by;

over-center means disposed within said piston and cooperating with said camming means for locking said piston selectively in either of a loaded or unloaded position.

5. The apparatus of claim 4 wherein said over-center means is characterized by:

a rectangular slot disposed within said piston, said slot locking said camming means therein if said camming means travels over a horizon passing through said slot.

6. The apparatus of claim 1 further characterized by;

over-center means disposed within said piston means and cooperating with said camming means for locking said piston means selectively in either of a loaded or unloaded position.

7. The apparatus of claim 6 wherein said over-center means is characterized by:

a rectangular slot disposed within said piston means, said slot locking said camming means therein if said camming means travels over a horizon passing through said slot.

* * * * *